(12) United States Patent
Tsuji

(10) Patent No.: US 8,147,036 B2
(45) Date of Patent: Apr. 3, 2012

(54) POLYFUNCTIONAL EPOXY COMPOUND, EPOXY RESIN, CATIONIC PHOTOPOLYMERIZABLE EPOXY RESIN COMPOSITION, MICRO STRUCTURED MEMBER, PRODUCING METHOD THEREFOR AND LIQUID DISCHARGE HEAD

(75) Inventor: Shinsuke Tsuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/301,877

(22) PCT Filed: Jun. 20, 2007

(86) PCT No.: PCT/JP2007/062829
§ 371 (c)(1),
(2), (4) Date: Nov. 21, 2008

(87) PCT Pub. No.: WO2007/148822
PCT Pub. Date: Dec. 27, 2007

(65) Prior Publication Data
US 2010/0271428 A1    Oct. 28, 2010

(30) Foreign Application Priority Data
Jun. 23, 2006 (JP) .................. 2006-174137

(51) Int. Cl.
*B41J 2/14* (2006.01)
(52) U.S. Cl. .......................... 347/47; 347/45
(58) Field of Classification Search ............ 347/44, 347/45, 46, 47, 54, 56
See application file for complete search history.

(56) References Cited

U.S. PATENT DOCUMENTS

| 4,688,052 A | * | 8/1987 | Inamoto et al. ............... 347/65 |
| 5,783,358 A | | 7/1998 | Schulthess et al. |
| 6,455,112 B1 | | 9/2002 | Ohkuma et al. |
| 6,472,129 B2 | | 10/2002 | Noguchi et al. |
| 6,750,290 B2 | | 6/2004 | Imamura et al. |
| 7,074,273 B2 | | 7/2006 | Shimomura et al. |
| 2001/0017639 A1 | * | 8/2001 | Noguchi et al. ............... 347/45 |
| 2002/0058210 A1 | * | 5/2002 | Noguchi et al. ............... 347/45 |
| 2004/0044255 A1 | * | 3/2004 | Shibuya et al. ............. 568/763 |
| 2004/0054036 A1 | | 3/2004 | Hatton et al. |
| 2004/0082734 A1 | | 4/2004 | Hatton et al. |
| 2006/0089466 A1 | | 4/2006 | Shimomura et al. |

FOREIGN PATENT DOCUMENTS

| JP | 2-279684 A | 11/1990 |
| JP | 7-214783 A | 8/1995 |
| JP | 11-322896 A | 11/1999 |

(Continued)

OTHER PUBLICATIONS

Office Action in Taiwanese Application No. 096122590 (Dec. 2011).

*Primary Examiner* — Manish S Shah
(74) *Attorney, Agent, or Firm* — Fitzpatrick, Cella, Harper & Scinto

(57) ABSTRACT

A hyper branched type epoxy resin including a polymerized substance generated from a polyfunctional epoxy compound represented by a formula (I), wherein the polyfunctional epoxy compound represented by the formula (I) includes group A having aromatic hydroxyl group, a carboxyl group or aromatic ring having an amino group, and epoxy containing group B having an epoxy group; wherein R represents an organic group of (n+1) valence, and n represents 2 or 3.

$$A-R-(B)_n \qquad (I)$$

8 Claims, 10 Drawing Sheets

FOREIGN PATENT DOCUMENTS

| | | |
|---|---|---|
| JP | 2000-256459 A | 9/2000 |
| JP | 2001-114825 A | 4/2001 |
| JP | 2003-020323 A | 1/2003 |
| JP | 2003-277472 A | 10/2003 |
| JP | 2004-512404 A | 4/2004 |
| JP | 2004-528423 A | 9/2004 |
| JP | 2004-300305 A | 10/2004 |
| JP | 2004-331768 A | 11/2004 |
| TW | 418215 B | 1/2001 |

* cited by examiner

POLYFUNCTIONAL EPOXY COMPOUND, EPOXY RESIN, CATIONIC PHOTOPOLYMERIZABLE EPOXY RESIN COMPOSITION, MICRO STRUCTURED MEMBER, PRODUCING METHOD THEREFOR AND LIQUID DISCHARGE HEAD

TECHNICAL FIELD

The present invention relates to a polyfunctional epoxy compound and an epoxy resin formed by a polymerized substance thereof. More particularly, the present invention relates to an epoxy resin capable of forming a novel cationic photopolymerizable epoxy resin composition, useful for constructing, by a photolithographic process on a substrate to be processed, a micro structured member such as a flow path forming member of an ink jet recording head. The present invention further relates to a micro structured member utilizing such epoxy resin composition, a producing method therefor, and a liquid discharge head.

BACKGROUND ART

Together with the recent advancements in scientific technologies, micro structured members are being actively developed in the fields of microactuators, electronic devices, optical devices and the like, and are being in commercial use in various microsensors, microprobes, thin film magnetic heads and ink jet recording heads.

For producing such micro structured member, various methods are utilized such as a stamper method, a dry etching and a photolithography. Among these, the pattern formation by a photolithography utilizing a photosensitive resinous material has an advantage that a desired pattern can be obtained simply with a high precision.

As the photosensitive resin composition to be employed for such purpose, a negative type cationic photopolymerizable epoxy resin composition may be employed in consideration of a pattern forming property, a chemical resistance and a heat resistance.

The preparation of a micro structured member utilizing a cationic photopolymerizable epoxy resin is conducted in the following manner. After it is uniformly coated for example by a coater on a substrate, it is subjected to an exposure process and a PEB process whereby a crosslinking reaction by epoxy groups proceeds only in an exposed area, and, in a development process, a surface irregularity (pattern) is formed by a difference in a dissolving rate in a developing solution, between an exposed area and an unexposed area.

For such cationic photopolymerizable epoxy resin composition, various characteristics are required when it is used in the aforementioned application. Such characteristics specifically include followings:

coating characteristics: uniformity in plane at coating;

high solid content formation: low viscosity and high solubility (ability for forming a thick film of tens of micrometers);

film characteristics: chemical resistance, excellent mechanical strength (high toughness) and adhesion to underlying surface;

photosensitive characteristics: high resolution, high dimensional stability, high sensitivity, and wide process margin;

productivity: high industrial productivity capable of enabling a mass production.

Particularly in the field of a liquid discharge head applied as an ink jet recording head and the like, the cationic photopolymerizable epoxy resin is normally used as members for forming a discharge port for a liquid such as ink and a liquid flow path, and is used in a state adjoined to a substrate such as of silicon. Such member is constantly in contact with an ink (which is generally constituted principally of water and is often not neutral), and, as a film, there are required a liquid resistance such as an excellent ink resistance, a mechanical strength and a high adhesion. Also it is recently made clear that the shape of the discharge port influences precision of liquid discharge, and high photosensitive characteristics are required in order to form a desired pattern with a high precision.

Various cationic photopolymerizable epoxy resin compositions have hitherto been proposed in order to meet these requirements, but each of these is not satisfactorily in meeting all these requirements, even though being excellent in some of the characteristics.

An ordinary epoxy resin is obtained by a polymerization reaction of an epoxy compound, including several epoxy groups, as a monomer. Therefore, the polymerization proceeds with simultaneous reactions of the plural epoxy groups, thus constructing a disorderly three-dimensional structure. In order to improve the coated film characteristics of the cationic photopolymerizable epoxy resin, as it is dependent on a primary molecular weight of a base resin in the composition, it is desirable to increase the molecular weight of the epoxy resin thereby improving the characteristics of the coated film. However, an increase in the molecular weight often results in a significant increase in the viscosity of the solution and in an evident decrease of the solubility in the solvent, whereby the improvement in the characteristics is inevitably restricted.

Also for such target, the improvement in the coated film characteristics may be intended by a method of controlling the molecular weight of the epoxy resin, executing a solution coating in a state where the molecular weight is maintained at about oligomers that can maintain a solubility in the solvent, and causing a crosslinking reaction of plural epoxy groups at a curing operation. It is often difficult, however, to form a thick film of several ten to several hundred micrometers, because of the molecular weight and the viscosity.

On the other hand, highly branched polymers are specific polymers having many branching points in a main chain, and are recently attracting attention as polymers involving unknown possibilities. As a feature thereof, it is made clear that they show a low viscosity in a solution and have a high solubility in various solvents, owing to a fact that an intermolecular entanglement is reduced in comparison with ordinary polymer.

The highly branched polymers are classified, according to the structure thereof, into a dendrimer represented by a following formula (2) and a hyper branched polymer represented by a following formula (3):

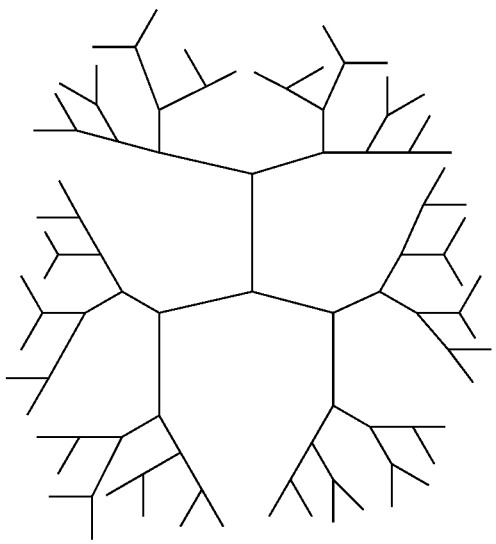

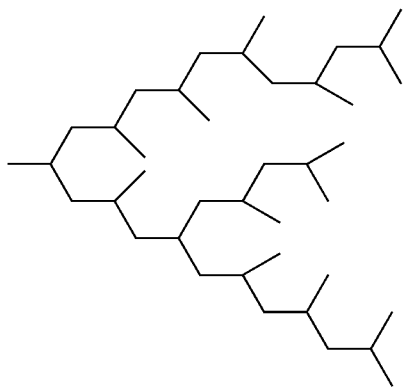

(3)

The dendrimer is, as represented by the formula (2), a polymer having a star-like structure. However, the synthesis of dentrimer requires a process of, starting from a core portion, repeating a protection, a bonding and a de-protection of a monomer, and is therefore cumbersome. It therefore involves a problem in the productivity and is unsuitable as a material for practical use.

The hyper branched polymer is investigated in various manners because of the attractive characteristics as described above. Various hyper branched polymers and producing method therefor are reported for example in Japanese Patent Application Laid-Open No. 2000-256459 and Japanese Patent Application Laid-Open No. 2001-114825.

Also Japanese Patent Application Laid-Open N 2004-331768 discloses an example of employing a hyper branched epoxy resin in a cationic photopolymerizable epoxy resin composition. More specifically, a hyper branched epoxy resin is synthesized, as represented by a following formula (38), by a bimolecular reaction of (A2+B3) type of a phenol compound and an epoxy compound:

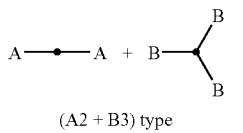

(38)

(A2 + B3) type

However, the hyper branched polymer obtained by the bimolecular reaction of (A2+B3) type may generally be insufficient in a level of branching per unit polymerization degree and in a number of terminal epoxy groups. Therefore, the properties resulting from these factors may be insufficient for use in the cationic photopolymerizable epoxy resin.

Also the hyper branched polymer obtained by the bimolecular reaction of (A2+B3) type has a property, in comparison with an AB2 type, that the molecular chain grows in multiple directions at the growth of the molecular chain, and does not provide a fan-shaped final form, thus causing a gelation at the polymerization.

As an example, let us consider monomers of A2 (following formula (6))+B3 (following formula (7)) type and an intermediate (following formula (8)) prepared by an addition reaction of one molecule each. A group A in the compound of formula (6) and a group A' in the compound of formula (8) are same, but are represented separately for the purpose of clarity:

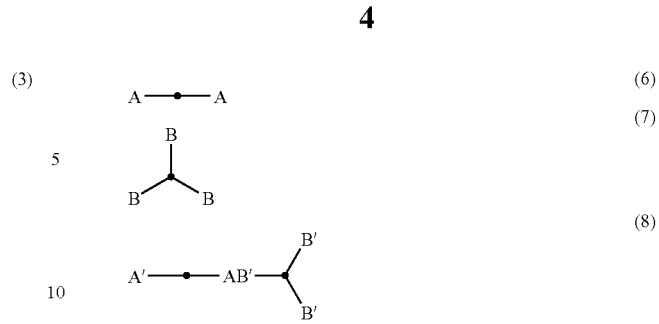

As to the reactivity of each functional group in the compounds (6), (7) and (8), at a stage where the compound (8) has grown to a certain level, it is desirable that the compound (8) grows as a polymer by a reaction of B' with A'. However, in the case that A' of the compound (8) reacts the polymerization reaction does not proceed in a fan shape but the molecular chain grows in multiple directions, thereby possibly causing a gelation at the polymerization. Also a difficulty exists in causing the epoxy groups to remain efficiently in terminal ends of the resulting polymer. For this reason, in case of synthesizing a hyper-branched type polymer of the A2+B3 type, it is necessary to strictly design the reactive groups of the two monomers in terms of reactivity, and a restriction is involved in the selection of the monomers.

DISCLOSURE OF THE INVENTION

The present invention has been made in consideration of the foregoing, and an object of the present invention is to provide an epoxy resin providing a cationic photopolymerizable epoxy resin composition, capable of forming a thick film, being rapidly cured by a light irradiation and forming a desired pattern with a high resolution. It is also an object of the present invention to provide a novel epoxy resin providing a cationic polymerization cured substance excellent in various properties such as chemical resistance, heat resistance and mechanical strength, and also having a high adhesion to the underlying layer.

Another object is to provide related inventions such as a micro structured member constituted of a cured substance of the aforementioned resin composition and a producing method therefor.

As a result of intensive investigations undertaken, the present inventors have found a novel epoxy compound described in the following as an example.

An example of the present invention is a polyfunctional epoxy compound, represented by a formula (1), including a nucleophilic organic group A having a nucleophilic group other than an epoxy group, and an epoxy-containing group B having an epoxy group:

A-R-(B)$_n$   (1)

wherein R represents an organic group of (N+1) valence, and n represents 2 or 3.

The epoxy resin of the present invention has following various features.

In comparison with the conventional epoxy resin, it has a not so high viscosity in solution and a high solubility in the solvent, and can therefore prepare a solution of a high solid content, whereby a thick film of from several ten to several hundred micrometers can be easily formed. Also it has a larger branching degree per unit polymerization degree and a larger number of terminal epoxy groups, in comparison with the hyper branched epoxy resin of A2+B3 type. Consequently, a drastically increased contrast can be provided in the crosslinking degree between before and after the light irradiation, and a desired pattern can be formed with a high resolution. Also a cured substance of the cationic photopolymerizable epoxy resin, having a high crosslinking density, exhibits a high heat resistance, a high chemical resistance and a high mechanical strength. Furthermore, the AB-linked group, present in a many number within the resin, expresses an excellent adhesive property as a hydroxyl group is generated by a ring-opening of the epoxy group.

Further features of the present invention will become apparent from the following description of exemplary embodiments with reference to the accompanying drawings.

BEST MODE FOR CARRYING OUT THE INVENTION

Figure 1A:
FIGS. 1A, 1B, 1C and 1D are schematic cross-sectional views illustrating a producing method for a micro structured member in an exemplary embodiment of the present invention.

In the following, descriptions will be given on a polyfunctional epoxy compound, an epoxy resin, a cationic photopolymerizable epoxy resin composition and a method of forming a micro structured member utilizing the same.

(1) Description of Cationic Photopolymerizable Epoxy Resin Composition: Hyper-Branched Type Epoxy Resin The hyper-branched type epoxy resin is a polymerized substance that is generated, utilizing a polyfunctional epoxy compound represented by a formula (1) as a monomer, by a self polymerization reaction principally by a bonding of an epoxy group thereof and a nucleophilic organic group A:

(1)

wherein R represents an organic group of an (n+1) valence; n represents 2 or 3; A represents a nucleophilic organic group other than an epoxy group, capable of bonding with an epoxy group; and B represents an organic group having an epoxy group.

In the following, as an example, a case of n=2 in the formula (1) will be described.

In the case of n=2, the hyper-branched type epoxy resin of the present invention is, in a comparative expression with a hyper-branched type epoxy resin of A2+B3 type represented by a formula (5), a hyper-branched type epoxy resin formed by a self polymerization of a monomer of AB2 type represented by a formula (4).

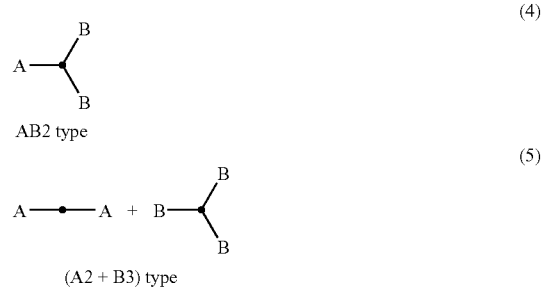

In the following, advantages of the present invention will be described in comparison with the conventional (A2+B3) type.

For example, let us consider a case of an addition reaction of 7 molecules in a comparison of an equivalent composition with a monomer of A2 (following formula (6))+B3 (following formula (7)) type, wherein B has an epoxy group. As indicated in Table 1, the AB2 type generates 8 terminal groups and 7 branching points, while the A2+B3 type only generates 3 terminal epoxy groups and 3 branching points (cf. Table 1: wherein A represents a nucleophilic organic group, B represents a terminal group, AB represents a linking group, and ▲ indicates a branching point).

TABLE 1

Therefore, in comparison with the hyper-branched type epoxy resin obtained by a bimolecular reaction of A2+B3 type, the present invention provides a higher branching degree per unit polymerization degree and a larger number of terminal epoxy groups, and exhibits a higher reactivity when used as a cationic photopolymerizable epoxy resin. The situation is also similar in a case of n=3 in the formula (1). Also the branched chains grow in a fan shape when seen in the entire molecule, and the epoxy groups are positioned at a terminal end of the molecule, and are considered less susceptible to a steric hindrance at the cationic polymerization. After the polymerization, in the A2+B3 type, a non-epoxy group A may be present as a terminal group, but the present invention can effectively prevent such situation.

For the characteristics of the hyper branched epoxy resin of the present invention, the structure of the polyfunctional epoxy compound, constituting the monomer, plays an important role. In the following, a preferred structure of the polyfunctional epoxy compound will be described.

In the polyfunctional epoxy compound, the nucleophilic organic group A of the formula (1) preferably has a higher reactivity with an epoxy group than a reactivity of the epoxy groups with each other, and is particularly preferably an aromatic hydroxyl group, a carboxyl group or an aromatic amino group. Particularly, an aromatic hydroxyl group is more preferable in consideration of the solvent resistance of the generated linking group. In case of employing a nucleophilic group having a reactivity with an epoxy group equal to or lower than the reactivity of the epoxy groups with each other, such as an aliphatic hydroxyl group, an addition reaction between the epoxy groups may proceed competitively with a higher probability at the polymerization reaction, whereby the expected hyper-branched type polymer may not be obtained. Also in case of employing a nucleophilic group having an extremely high reactivity with the epoxy group such as an aliphatic amino group, difficulties may result in the molecular weight control and in the storage stability of the polymerized substance, because of the excessively high reactivity.

The group R in the formula (1) is not particularly restricted and various organic groups may be employed for this purpose. In consideration of the heat resistance and the chemical resistance of the polymerized substance and the resin composition, preferred is an organic group containing at least an aromatic or an alicyclic skeleton. Also the group R preferably has a molecular weight of 1,000 or less, more preferably 750 or less and most preferably 500 or less. A large molecular weight of R increases the epoxy equivalent of the polymerized substance, and, in the use as a cationic photopolymerizable epoxy resin, a lowered crosslinking density may lead to a loss in the resolution and in the reliability.

The epoxy-containing group B in the formula (1) is not particularly restricted, so far as it contains one epoxy group only. It is important that the number of epoxy group is one, and such epoxy group is preferably a mono-substituted or di-substituted epoxy group in consideration of the reactivity, and, in case of a di-substituted epoxy group, a cyclohexene oxide group is preferred. A poly-substituted epoxy group reduces the reactivity of the epoxy group, and, when used as a cationic photopolymerizable epoxy resin, may deteriorate the resolution and the reliability by a decrease in the crosslinking density.

The epoxy-containing group B preferably has a molecular weight of 500 or less, including the epoxy group, more preferably 400 or less and most preferably 300 or less. An excessively high molecular weight of the epoxy-containing group B increases the molecular weight of the entire epoxy compound, thus increasing the epoxy equivalent of the polymerized substance, and, when used as a cationic photopolymerizable epoxy resin, may reduce the resolution and the reliability by a decrease in the crosslinking density. Specific examples of the structure of the epoxy-containing group B include skeletal formulae (9) to (20) indicated in Table 2.

TABLE 2

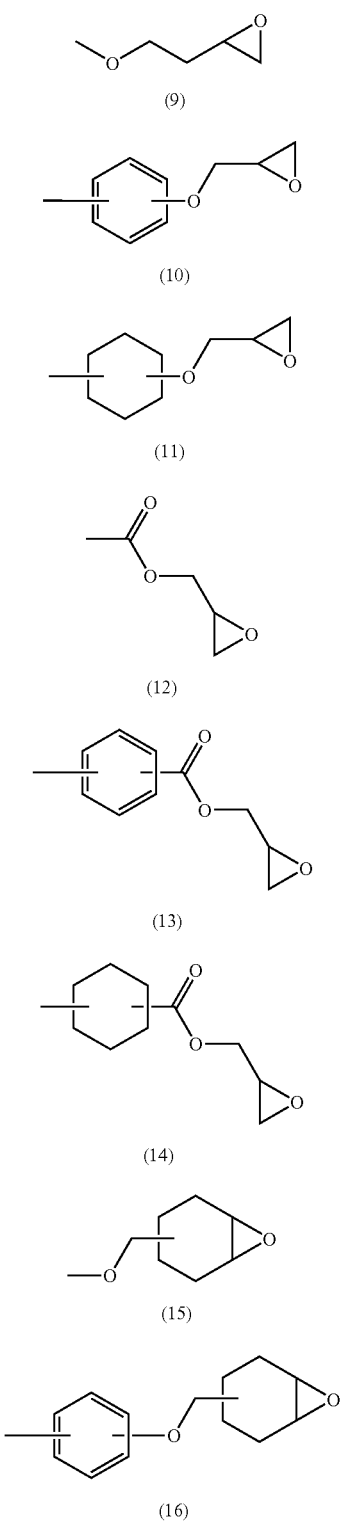

TABLE 2-continued

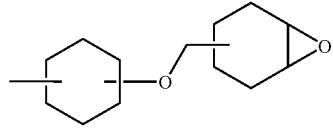

(17)

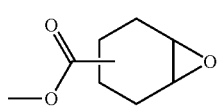

(18)

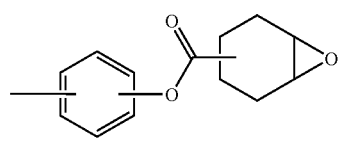

(19)

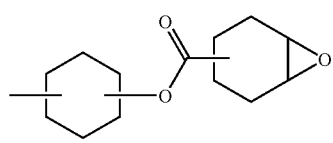

(20)

It is important that a number of epoxy groups in the formula (1) is 2 or 3. In the case that four or more epoxy groups are present, the molecular weight control at the polymerization becomes difficult, possibly causing a gelation. Also in the case that one epoxy group is present, the molecular chain becomes linear, and the characteristics of the cured substance of the cationic photopolymerizable epoxy resin composition are deteriorated as a film, due to few number of the terminal epoxy groups.

The epoxy compound in the formula (1) is not particularly restricted in the producing method thereof, and may be synthesized, for example, from a compound having two or three epoxy groups within a molecule and an organic group that can be derived to a nucleophilic organic group capable of bonding with an epoxy group.

For example, it can be obtained by a de-protection reaction, as indicated by a formula (39), from a diglycidyl compound (B), obtained from a mono-hydroxyl protected member (A) of trihydroxybenzene (wherein P represents a protecting group).

(39)

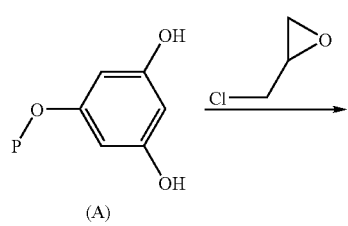

(A)

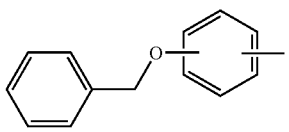

(B)

The organic group that can be derived to a nucleophilic organic group may be any group, without any particular restriction, so far as it has a low reactivity with the epoxy group and it can be derived to a nucleophilic organic group under a condition that the epoxy group does not undergo a ring-opening or a decomposition or under a condition that the epoxy groups do not react with each other. It may be selected according to the desired nucleophilic organic group and according to the condition of deriving reaction. Examples include, in Table 3, an arylbenzyl ether group (formula 21), a benzyl ester group (formula 22) and a nitroaryl group (formula 23) that can be derived to a nucleophilic organic group under a reducing condition in which the epoxy group does not undergo a ring-opening. Examples further include an arylsilyl ether (formula 24) and an aryltetrahydropyranyl ether (formula 25) that can be derived to a nucleophilic organic group under an acidic condition in which the epoxy groups do not react with each other.

TABLE 3

(21)

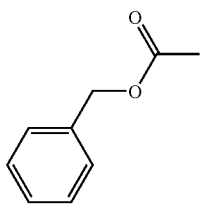

(22)

TABLE 3-continued

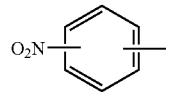

(23)

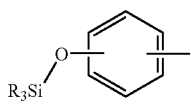

(24)

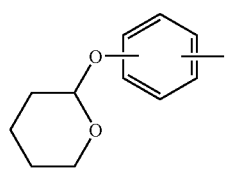

(25)

The hyper branched epoxy resin may be produced by a method of executing a polymerization reaction after the epoxy compound is isolated and purified, or a method of executing a polymerization reaction immediately after a de-protection reaction of the precursor, without isolation and purification. Particularly in case of employing a nucleophilic organic group having a high reactivity with the epoxy group (in case of an epoxy compound having a high self polymerizing property), the operations of isolation and purification may be difficult, so that it is desirable to execute the polymerization reaction immediately after the de-protection reaction.

For example, in the case that the compound (B) includes a benzyl group as the protective group, the benzyl group is cleaved by a catalytic hydrogenation at a low temperature as indicated by a formula (26), thereby generating a desired monomer in the reaction system. After the completion of de-protection, the reaction temperature is elevated to cause a self polymerization of the monomer generated in the system, thereby obtaining a hyper branched epoxy resin. In this operation, it is also possible, after the completion of de-protection, to add a polymerization reaction promoter such as an amine-containing compound, a quaternary onium salt compound, an amine salt compound, a phosphorus-containing compound, or a crown ether complex to the system, thereby improving the reaction efficiency of the polymerization reaction. Also in the case that a reaction reagent employed for the de-protection reaction may inhibit the polymerization reaction, it is desirable to execute an operation of eliminating such reagent from the reaction system after the completion of the de-protection reaction, and then to execute the polymerization reaction.

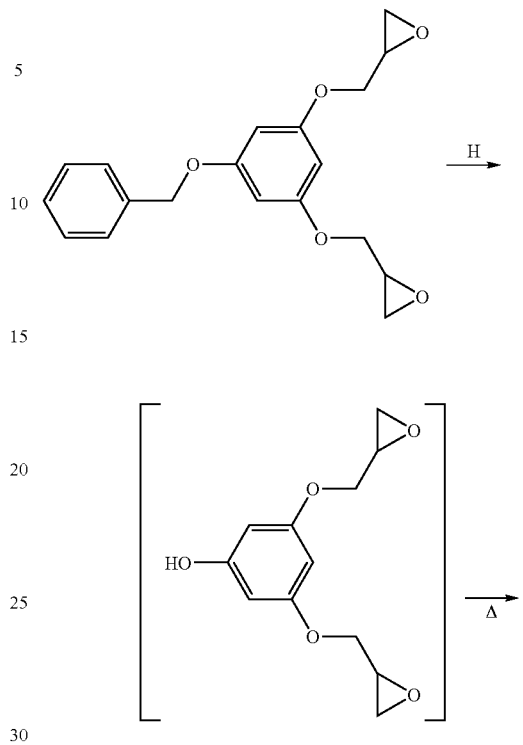

(26)

As another example, it is also possible to produce a hyper-branched type epoxy resin without utilizing a protective group, by reacting, as indicated in a formula (27), a trifunctional phenol compound such as phloroglucinol with two equivalents of epichlorohydrin, and executing a polymerization reaction in the system, in succession to an addition reaction and a cyclization reaction.

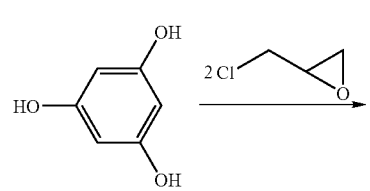

(27)

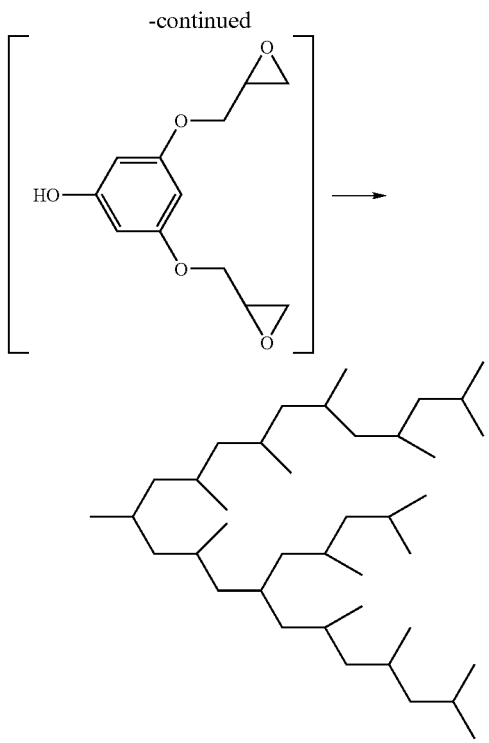

On the other hand, a nucleophilic organic group having a high reactivity with the epoxy group may result in a problem in the storage stability of the resin solution. This is because the nucleophilic organic group remains at a terminal end of the oligomer and the polymer (terminal end opposite to the epoxy group). It is therefore desirable, at the termination of the polymerization reaction or after the preparation of epoxy resin, to react sealing agent for the terminal nucleophilic group, thereby converting the nucleophilic group into another non-nucleophilic group.

Furthermore, the hyper-branched type epoxy resin, so far as it is a compound represented by the formula (1), is not limited to a homopolymer of a single compound but may also be a copolymer utilizing plural compounds of different structures. It is therefore possible to prepare a cationic photopolymerizable epoxy resin composition capable of satisfying many characteristics, by copolymerizing various monomers of molecular structures corresponding to the desired properties.

A content of the hyper-branched type epoxy resin in the resin composition may be arbitrarily selected according to the target characteristics. It is preferably selected within a range of from 10 to 99 wt % with respect to the weight of the entire composition, more preferably from 20 to 95 wt % and further preferably from 30 to 90 wt %. An excessively low content of the hyper-branched type epoxy resin may be unable to sufficiently exhibit the effects of the present invention.

The hyper-branched type epoxy resin synthesized as described above, having a lower viscosity in solution and a higher solubility in solvent in comparison with the conventional epoxy resins, can be prepared into a solution of a high solid content, whereby a thick film of from several ten to several hundred micrometers can be easily formed. Also it has a higher branching level per unit polymerization degree and a larger number of terminal epoxy groups. Therefore, when used as a cationic photopolymerizable epoxy resin composition, it can provide a drastically increased contrast in the crosslinking degree between before and after the light irradiation, thereby capable of forming a desired pattern with a high resolution. Furthermore, the cured substance of the cationic photopolymerizable epoxy resin, having a high crosslinking density, exhibits a high heat resistance, a high chemical resistance and a high mechanical strength.

The hyper-branched type epoxy resin thus obtained can be used, together with a cationic photopolymerization initiator, as a cationic photopolymerizable epoxy resin. Also various additives may be added.

The Cationic Photopolymerization Initiator

The cationic photopolymerization initiator may be, without any particular restriction, any compound capable of generating cation species exhibiting a strong acidic property by a light irradiation, such as an onium salt, a borate salt, a triazine compound, an azo compound, or a peroxide. Examples of the onium salt include an iodonium salt, a sulfonium salt, a diazonium salt, an ammonium salt and a pyridinium salt. Also examples of a halogen-containing compound include a haloalkyl group-containing hydrocarbon compound and a haloalkyl group-containing heterocyclic compound (such as a halomethyltriazine derivative). Also examples of a diazoketone compound include a 1,3-diketo-2-diazo compound, a diazobenzoquinone compound, and a diazonaphthoquinone compound, and examples of a sulfone compound include $\beta$-ketosulfone and $\beta$-sulfonylsulfone. Also examples of sulfonic acid compound include an alkylsulfonic acid ester, a haloalkylsulfonic acid ester, an arylsulfonic acid ester and an iminosulfonate. Among these, in consideration of the sensitivity, stability, reactivity and solubility, an aromatic sulfonium salt and an aromatic iodonium salt are employed advantageously. Commercial examples of the aromatic sulfonium salt include TPS-102, 103, 105, MDS-103, 105, 205, 305, DTS-102, 103 (foregoing available from Midori Chemical Co.), SP-170, and 172 (foregoing available from Adeka Corp.). Also examples of the aromatic iodonium salt include DPI-105, MPI-103, 105, BBI-101, 102, 103, and 105 (available from Midori Chemical Co.). Selection may be made among these, according to an exposure wavelength to be used. Such polymerization initiators may be used singly or in a mixture of plural kinds.

A content of the cationic photopolymerization initiator in the resin composition may be selected arbitrarily, so as to obtain a sensitivity and a crosslinking density desired. In particular, the cationic photopolymerization initiator can be used preferably within a range of from 0.1 to 30 wt % with respect to the epoxy resin, more preferably within a range of from 0.3 to 20 wt % and further preferably within a range of from 0.5 to 10 wt %. Also a spectral sensitizer may be used when necessitated. For example SP-100 (available from Adeka Corp.) and the like may be added.

Other Additives

In the cationic photopolymerizable epoxy resin composition of the present invention, various additives may be added without any particular restriction, for the purposes of increasing a crosslinking density, improving a coating property, improving a water resistance, improving a solvent resistance, providing a flexibility and improving an adhesion with the substrate. Also these additives may be added in plural kinds.

For example, oligomers and polymers other than the hyper-branched type epoxy resin may be used for regulating various characteristics. Specific examples include followings:

epoxy resin, and hydroxystyrenes such as poly-p-hydroxystyrene, poly-m-hydroxystyrene, poly-4-hydroxy-2-methylstyrene, poly-4-hydroxy-3-methylstyrene, poly-$\alpha$-methyl-p-hydroxystyrene, a partially hydrogenated poly-p-hydroxystyrene copolymer, a poly(p-hydroxystyrene-$\alpha$- methyl-p-hydroxystyrene) copolymer, poly(p-hydroxystyrene-α-methylstyrene) copolymer, poly(p-hydroxystyrene-styrene) copolymer, a poly(p-hydroxystyrene-m-hydroxystyrene) copolymer, a poly(p-hydroxystyrene-styrene) copolymer, a poly(p-hydroxystyrene-indene) copolymer, a poly(p-hydroxystyrene-acrylic acid) copolymer, a poly(p-hydroxystyrene-methacrylic acid) copolymer, a poly(p-hydroxystyrene-methyl acrylate) copolymer, a poly(p-hydroxystyrene-acrylic acid-methyl methacrylate) copolymer, a poly(p-hydroxystyrene-methyl acrylate) copolymer, a poly(p-hydroxystyrene-methacrylic acid-methyl methacrylate) copolymer, polymethacrylic acid, polyacrylic acid, a poly(acrylic acid-methyl acrylate) copolymer, a poly(methacrylic acid-methyl methacrylate) copolymer, a poly(acrylic acid-maleimide) copolymer, a poly(methacrylic acid-maleimide) copolymer, a poly(p-hydroxystyrene-acrylic acid-maleimide) copolymer, and a poly(p-hydroxystyrene-methacrylic acid-maleimide) copolymer.

Commercial products of these include followings:

UVR-6100, UVR-6105, UVR-6110, UVR-6128, UVR-6200 (foregoing available from Union Carbide Inc.), Celloxide 2021, Celloxide 2021P, Celloxide 2081, Celloxide 2083, Celloxide 2085, Celloxide 2000, Celloxide 3000, Cyclomer A200, Cyclomer M100, Cyclomer M101, Epolide GT-301, Epolide GT-302, Epolide GT-401, Epolide GT-403, EHPE 3150, Epolide HD300 (foregoing available from Daicel Chemical Industries Co.), KRM-2110, KRM-2199 (foregoing available from Adeka Corp.), Epicote 801, Epicote 828 (foregoing available from Yuka-Shell Epoxy Co.), PY-306, 0163, DY-022 (foregoing available from Ciba-Geigy Ltd.), KRM-2720, EP-4100, EP4000, EP4080, EP4900, ED-505, ED-506 (foregoing available from Adeka Corp.), Epolite M-1230, Epolite EHDG-L, Epolite 40E, Epolite 100E, Epolite 200E, Epolite 400E, Epolite 70P, Epolite 200P, Epolite 400P, Epolite 1500NP, Epolite 1600, Epolite 80MF, Epolite 100MF, Epolite 4000, Epolite 3002, Epolite FR-1500 (foregoing available from Kyoeisha Chemical Co.), Suntoto ST0000, YD-716, YH-300, PG-202, PG-207, YD-172 and YDPN 638 (foregoing available from Toto Kasei Co.).

These regulating agents may be employed singly or in a mixture of plural kinds.

Also a surfactant of fluorinated type or nonionic type or an adhesion promoter may be used for the purpose of improving the coating property.

The surfactant may be used without any particular restriction, and specific examples of commercially available products include followings:

Eftop EF301, EF303, EF352 (foregoing available from Tochem Products Ltd.), Megafac F171, F173, R-30 (foregoing available from Dai-Nippon Ink and Chemicals Co.), Florad FC430, FC431 (foregoing available from Sumitomo-3M Co.), Asahiguard AG710, Surflon S-382, SC101, SC102, SC103, SC104, SC105 and SC106 (foregoing available from Asahi Glass Co.).

The adhesion promoter may be used without any particular restriction, and specific examples thereof include followings:

silane coupline agents for example chlorosilanes such as trimethylchlorosilane, dimethylvinylchlorosilane, methyldiphenylchlorosilane and chloromethyldimethylchlorosilane; alkoxysilanes such as trimethylthoxysilane, dimethyldiethoxysilane, methyldimethoxysilane, dimethylvinylethoxysilane, diphenyldimethoxysilane, and phenyltriethoxysilane; silazanes such as hexamethyldisilazane, N,N'-bis(trimethylsilyl)urea, dimethyltrimethylsilylamine and trimethylsilylimidazole; silanes such as vinyltrichlorosilane, γ-chloropropyltrimethoxysilane, γ-aminopropyltriethoxysilane, γ-methacryloxypropyltrimethoxysilane and γ-glycidoxypropyltrimethoxysilane; heterocyclic compounds such as benzotriazole, benzimidazole, indazole, imidazole, 2-mercaptobenzimidazole, 2-mercaptobenzothiazole, 2-mercaptobenzoxazole, urazole, thiourasil, mercaptoimidazole, and mercaptopyrimidine; urea and thiourea compounds such as 1,1-dimethylurea and 1,3-dimethylurea.

A content of other additives in the resin composition may be selected arbitrarily according to the target characteristics. The content is preferably within a range of from 0 to 70 wt % with respect to the entire weight, more preferably within a range of from 1 to 60 wt % and further preferably within a range of from 3 to 50 wt %.

Coating Solvent

The cationic photopolymerizable epoxy resin composition of the present invention is used as a solution in an organic solvent.

Such organic solvent is not particularly restricted so far as it can uniformly dissolve the resin composition.

Specific examples thereof include followings:

ketone type solvents such as methyl ethyl ketone, methyl amyl ketone, methyl isobutyl ketone, cyclohexanone and cyclopentanone; ether type solvents such as ethyl cellosolve, butyl cellosolve, and propylene glycol monomethyl ether; ester type solvents such as ethyl lactate, butyl lactate, ethylcarbitol acetate, butylcarbitol acetate, propylene glycol monomethyl ether acetate, and γ-butyrolactone; amide type solvents such as N,N-dimethylformamide, N,N-dimethylacetamide, N-methylpyrrolidone, N-vinylpyrrolidone, and N-methylcaprolactam; and hydrocarbon type solvents such as cyclohexane, toluene and xylene.

These organic solvents may be employed singly, or, for the purpose of improving solubility or coating property, in a mixture of two or more kinds.

The cationic photopolymerizable epoxy resin composition of the present invention is used with a solid concentration preferably within a range of from 1 to 95 wt %, more preferably within a range of from 5 to 90 wt % and further preferably within a range of from 10 to 80 wt %. An excessively low solid concentration may be unable to obtain a desired viscosity and exhibits a difficult in forming a thick film of several ten micrometers or more, while an excessively high solid concentration may cause a problem in the storage stability, such as formation of a deposited substance resulting from a limit in the solubility.

(2) Micro Structured Member and Producing Method Therefore

In the following, the micro structured member of the present invention and a producing method therefor will be described briefly with reference to FIGS. 1A to 1D, 2A and 2B.

FIGS. 1A to 1D, 2A and 2B are schematic cross-sectional views illustrating the micro structured member of the present invention and the producing method therefor.

At first, as illustrated in FIG. 1A, a substrate 101 for forming a micro structured member is prepared. Silicon or glass may be used as the material constituting the substrate 101.

Figure 1B:
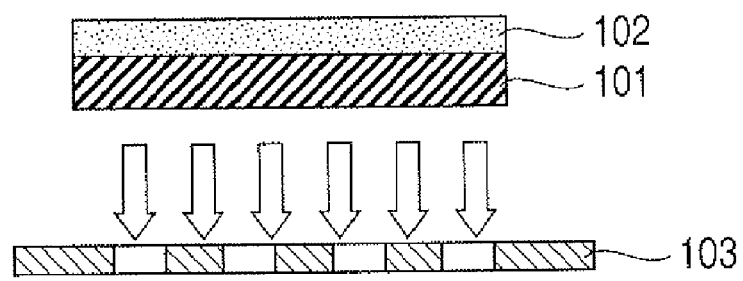

Then, as illustrated in FIG. 1B, the aforementioned cationic photopolymerizable epoxy resin composition is solvent coated on the surface of the substrate 101, thereby forming a resin layer 102 of the cationic photopolymerizable epoxy resin composition.

Figure 1C:

Then, as illustrated in FIG. 1C, the resin layer 102 is exposed to light, utilizing a mask 103.

Figure 1D:
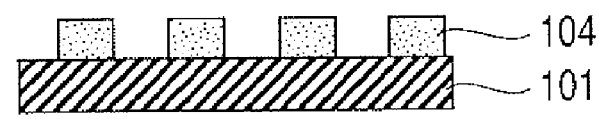

Thereafter, a developing process is executed to form a pattern, as illustrated in FIG. 1D, which is subjected to a heating treatment when necessitated to obtain a micro structured member 104 constituted of a cured substance of the cationic photopolymerizable epoxy resin composition.

Figure 2A:
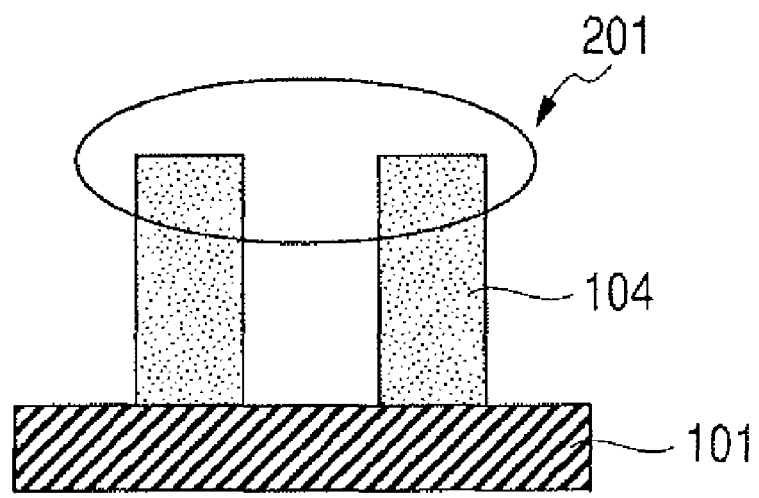
FIGS. 2A and 2B are schematic cross-sectional views for describing a micro structured member in an exemplary embodiment of the present invention.

The pattern of the micro structured member of the present invention may be formed into a neat rectangular profile or in a tapered profile, by a change in the exposure condition. Also because of a high contrast between an exposed portion and an unexposed portion, an edge portion 201 (indicated by a circle in the drawings) has a sharp angle as illustrated in FIG. 2A.

Figure 2B:
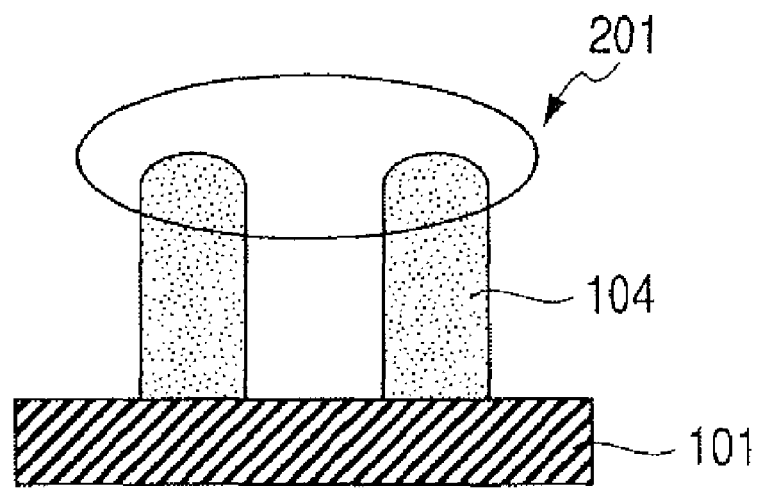

On the other hand, a micro structured member is formed by the aforementioned method with an ordinary negative resist instead of the resin composition of the present invention, the edge portion 201 does not have a sharp angle but has a rounded shape as illustrated in FIG. 2B, though it is dependent on the exposure condition and the resist formulation.

When the micro structured pattern is utilized in producing an apparatus including a micro structure such as liquid discharge heads, the above-described phenomenon may affect the performance thereof. This will be described with reference to FIGS. 3A and 3B.

Figure 3A:
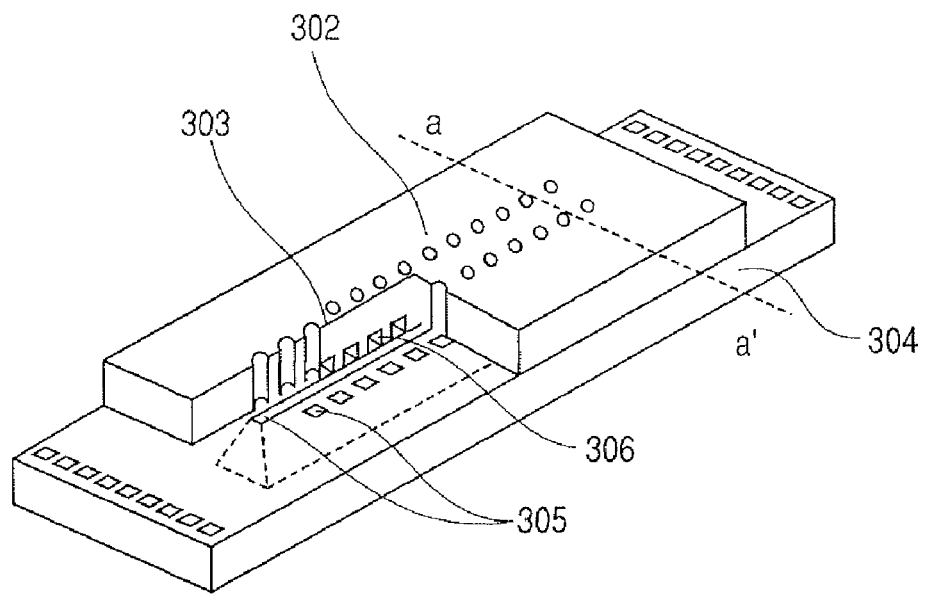
FIGS. 3A and 3B are respectively a perspective view and a schematic cross-sectional view illustrating a liquid discharge head in an exemplary embodiment of the present invention.
Figure 3B:
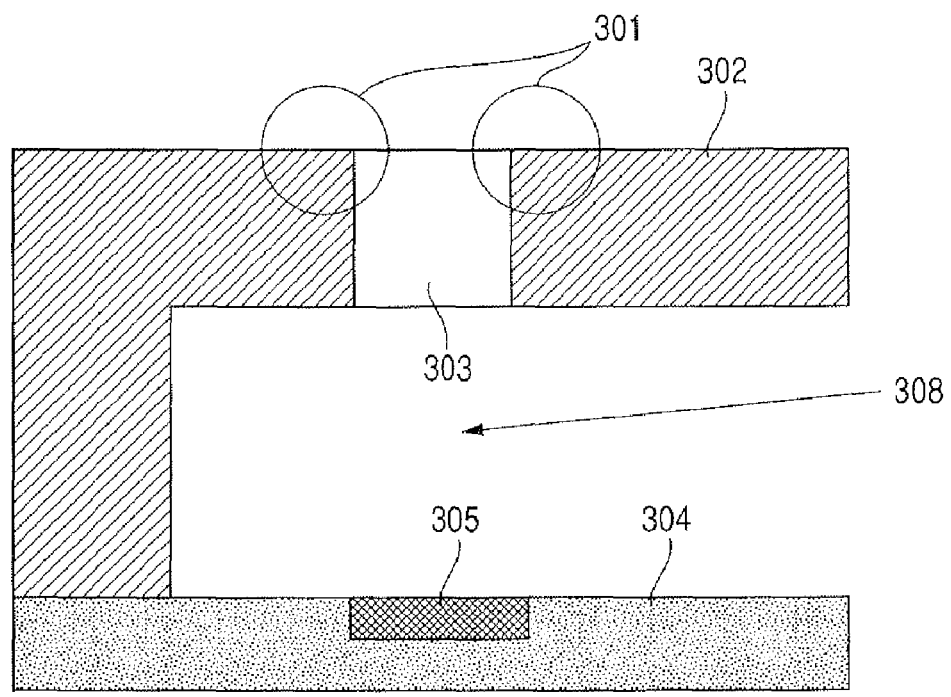

FIGS. 3A and 3B are schematic cross-sectional views illustrating an example of the liquid discharge head of the present invention. The liquid discharge head of the present exemplary embodiment includes a substrate 304, in which energy generating elements are formed in two arrays with a predetermined pitch. The substrate 304 includes a liquid supply opening 306, disposed between the two arrays of the energy generating elements 305. Above the substrate 304, disposed is a discharge port forming member 302 to constitute a discharge port 303 opened above the energy generating element 305, and an individual liquid flow path 308 communicating from the supply opening 306 to the discharge port 303.

FIG. 3B is a schematic cross-sectional view illustrating a vicinity of the discharge port for discharging a liquid, provided in the liquid discharge head.

When the micro structured member is employed as a member 302 for forming the discharge port 303 of the liquid discharge head, a precision of discharge of the liquid to be discharged varies depending on the shape of the edge portions 301 (indicated by a circle in the drawing) of the discharge port 303.

As a result of investigations undertaken by the present inventors, it is recently clarified that the precision of discharge becomes higher as the edge portion 301 has a sharper angled shape. The cationic photopolymerizable epoxy resin composition of the present invention allows to form the edge boundary portion 301 in a sharp angled shape, thereby enabling to prepare an ink jet recording head of a high discharge precision.

The liquid discharge head of the present invention can be produced for example as illustrated in FIGS. 4A to 4F.

FIGS. 4A to 4F are cross-sectional views along a plane passing a line a-a' in FIG. 3A and perpendicular to the substrate 304, and are schematic cross-sectional views illustrating an example of the producing method for the liquid discharge head of the present invention.

Figure 4A:
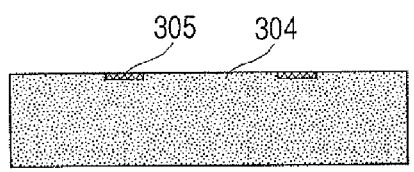
FIGS. 4A, 4B, 4C, 4D, 4E and 4F are schematic cross-sectional views illustrating a producing method for a liquid discharge head in an exemplary embodiment of the present invention.

At first, as illustrated in FIG. 4A, a substrate 304, on which an energy generating element 305 is formed, is prepared.

Figure 4B:
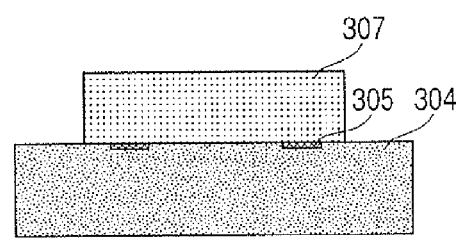

Then, as illustrated in FIG. 4B, a sacrifice layer 307 is formed on the substrate 304. The sacrifice layer may be suitable selectable, so far as it can be removed by dissolving later.

Figure 4C:
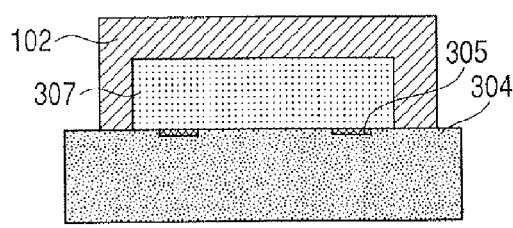

Then, as illustrated in FIG. 4C, the cationic photopolymerizable epoxy resin composition of the present invention is dissolved in an appropriate solvent and a resin layer 102 is formed so as to cover the sacrifice layer 307.

Figure 4D:
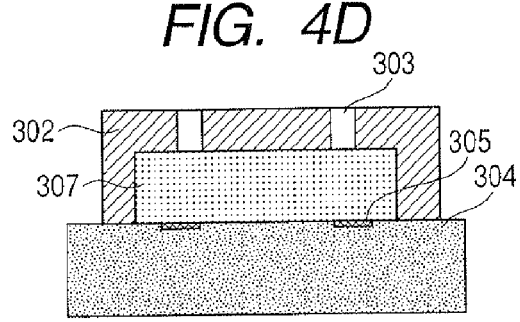

Then, as illustrated in FIG. 4D, the resin layer is subjected to an exposure and a development to form a discharge port forming member 302.

Figure 4E:
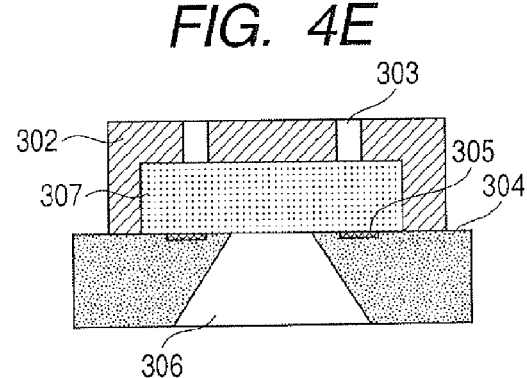

Then, as illustrated in FIG. 4E, a supply opening 306 is formed from a rear surface of the substrate 304.

Figure 4F:
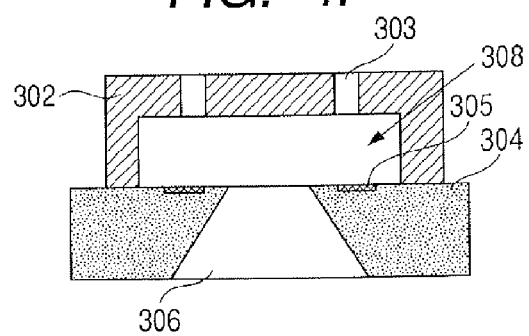

Then, as illustrated in FIG. 4F, the sacrifice layer 307 is removed thereby connecting the supply opening 306 and the discharge 303 and forming a flow path 308.

In the following, the present invention will be clarified in further details by exemplary embodiments thereof.

Synthesis of Polyfunctional Epoxy Compound

SYNTHESIS EXAMPLE 1

A compound represented by the formula (28), which is an example of the polyfunctional epoxy compounds (I), was synthesized by a following method.

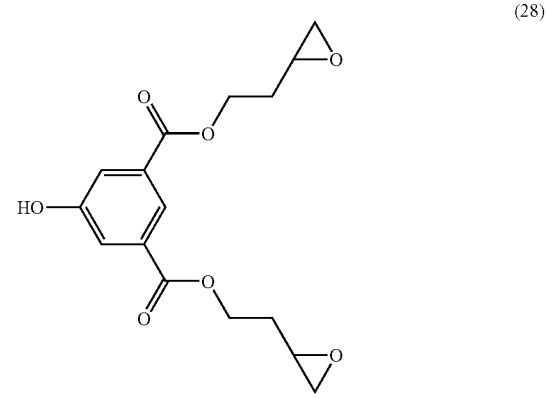

(28)

SYNTHESIS EXAMPLE 1-1

Synthesis of dimethyl 5-benzyloxyisophthalate (31)

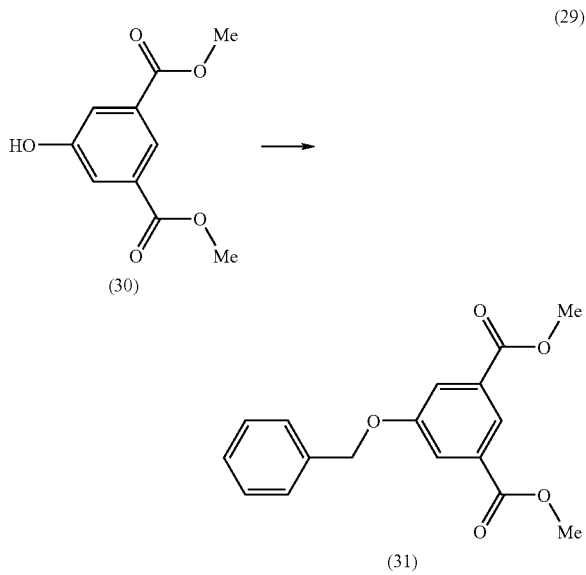

The reaction described in the formula (29) was executed in the following manner.

In a flask equipped with an agitator, a reflux condenser and a thermometer, 25.0 g (112 mmol) of dimethyl 5-hydroxyisophthalate (30) (manufactured by Tokyo Chemical Industry Co.), 100 ml of dehydrated acetonitrile (manufactured by Wako Pure Chemical Industries Ltd.) and 25 ml of dehydrated dimethylacetamide (manufactured by Wako Pure Chemical Industries Ltd.) were charged. 22.0 g (159 mmol) of potassium carbonate (manufactured by Kishida Chemical Co.) and 26.5 g (155 mmolf benzyl bromide (manufactured by Tokyo Chemical Industry Co.) were added to the obtained solution, which was then agitated for 2 hours under refluxing and under a nitrogen atmosphere.

After the reaction solution was cooled to the room temperature, potassium carbonate was filtered off and 1N hydrochloric acid was added at 0° C. The product was extracted with ethyl acetate, and the extract liquid was rinsed with a saturated aqueous solution of sodium chloride and dried with anhydrous sodium sulfate. The solvent was distilled off under a reduced pressure, and a resulting residue was recrystallized from ethanol to obtain dimethyl 5-benzyloxyisophthalate (31) as colorless acicular crystals (32 g, 89%):

1H-NMR (500 MHz, d6-DMSO, δ ppm): 3.86 (s, 6H), 5.21 (s, 2H), 7.33 (t, J=7.5 Hz, 1H), 7.39 (t, J1=7.0 Hz, J2=7.5 Hz, 2H), 7.46 (d, J=7.0 Hz, 2H), 7.73 (d, J=1.5 Hz, 2H), 8.05 (t, J=1.5 Hz, 1H);

13C-NMR (500 MHz, d6-DMSO, δ ppm): 52.63 (2C), 69.97, 119.78 (2C), 122.1, 127.73 (2C), 128.12, 128.61 (2C), 131.65 (2C), 136.47, 158.73, 165.28 (2C);

IR (KBr): 3008, 2955, 1721, 1597, 1500, 1460, 1438, 1347, 1307, 1248, 1189, 1117, 1081, 1057, 1034, 1006, 986, 897, 878, 790, 758, 733, 692.

SYNTHESIS EXAMPLE 1-2

Synthesis of dibutene 5-benzyloxyisophthalate (33)

The reaction described in the formula (32) was executed in the following manner.

In a flask equipped with an agitator, a reflux condenser, a Dean-Stark trap and a thermometer, 10.0 g (33.3 mmol) of dimethyl 5-benzyloxyisophthalate (31) (manufactured by Tokyo Chemical Industry Co.), 36.3 g (503.4 mmol) of 3-buten-1-ol (manufactured by Tokyo Chemical Industry Co.), 45.8 g (331.3 mmol) of potassium carbonate (manufactured by Kishida Chemical Co.) and 100 ml of dehydrated acetonitrile (manufactured by Wako Pure Chemical Industries Ltd.) were charged. The obtained solution was then agitated for 2 hours under refluxing and under a nitrogen atmosphere.

After the reaction solution was cooled to the room temperature, potassium carbonate was filtered off and 1N hydrochloric acid was added at 0° C. The product was extracted with ethyl acetate, and the extract liquid was rinsed with a saturated aqueous solution of sodium chloride and dried with anhydrous sodium sulfate. The solvent and unreacted 3-buten-1-ol were distilled off under a reduced pressure. A resulting residue was purified by a silica gel column chromatography (silica gel: Silica Gel 60 (spherical, neutral) manufactured by Nakalai Tesque Inc., developing solvent: ethyl acetate/cyclohexane=1/4) to obtain dibutene 5-benzyloxyisophthalate (33) as a colorless oily substance (11.0 g, 87%):

1H-NMR (500 MHz, d6-DMSO, δ ppm): 2.46 (br-q, J=6.5 Hz, 4H), 4.32 (t, J=6.5 Hz, 4H), 5.07 (br-d, J=10.5 Hz, 2H), 5.15 (br-d, J=17.0 Hz, 2H), 5.20 (s, 2H), 5.85 (m, 2H), 7.33 (t, J=7.5 Hz, 1H), 7.39 (t, J=7.5, 2H), 7.46 (d, J=7.5 Hz, 2H), 7.71 (d, J=1.5 Hz, 2H), 8.05 (t, J=1.5 Hz, 1H);

13C-NMR (500 MHz, d6-DMSO, δ ppm): 32.70 (2C), 64.17 (2C), 69.98, 117.40 (2C), 119.75 (2C), 122.03, 127.77 (2C), 128.13, 128.60 (2C), 131.81 (2C), 134.55 (2C), 136.43, 158.67, 164.70 (2C);

IR (neat): 3074, 2958, 1721, 1642, 1596, 1498, 1455, 1380, 1335, 1308, 1234, 1118, 1040, 988, 916, 756, 697.

SYNTHESIS EXAMPLE 1-3

Synthesis of 5-benzyloxyisophthalic acid dibutylenoxide (35)

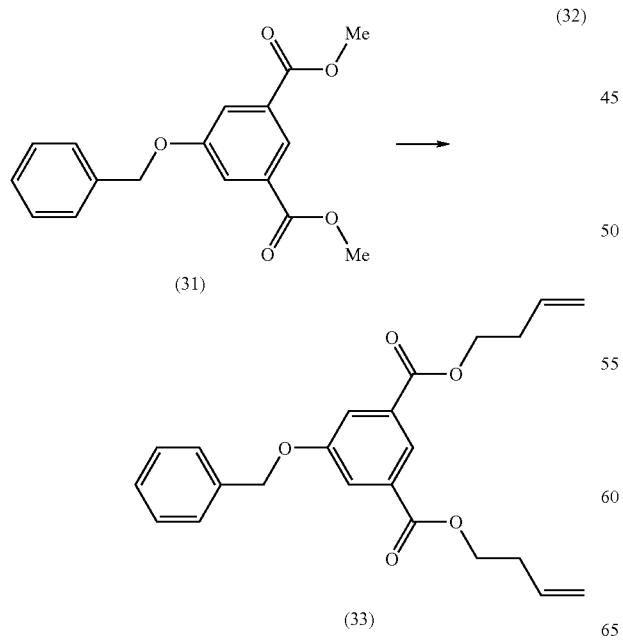

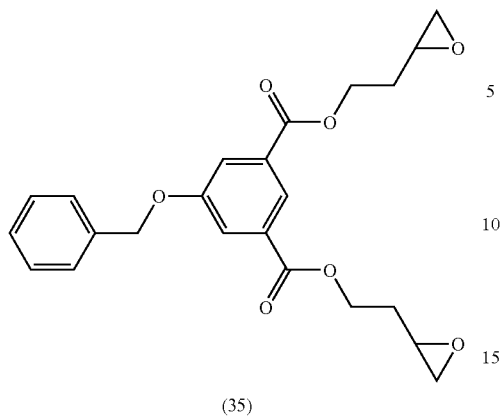

(35)

The reaction described in the formula (34) was executed in the following manner.

In a flask equipped with an agitator, a reflux condenser and a thermometer, 3.5 g (9.2 mmol) of dibutene 5-benzyloxy-isophthalate (33), 100 ml of dehydrated chloroform (manufactured by Wako Pure Chemical Industries Ltd.) and 8.9 g (51.6 mmol) of m-chloroperbenzoic acid (manufactured by Tokyo Chemical Industry Co.) were charged. The obtained solution was agitated for 7 hours under heating and under a nitrogen atmosphere.

Figure 5:
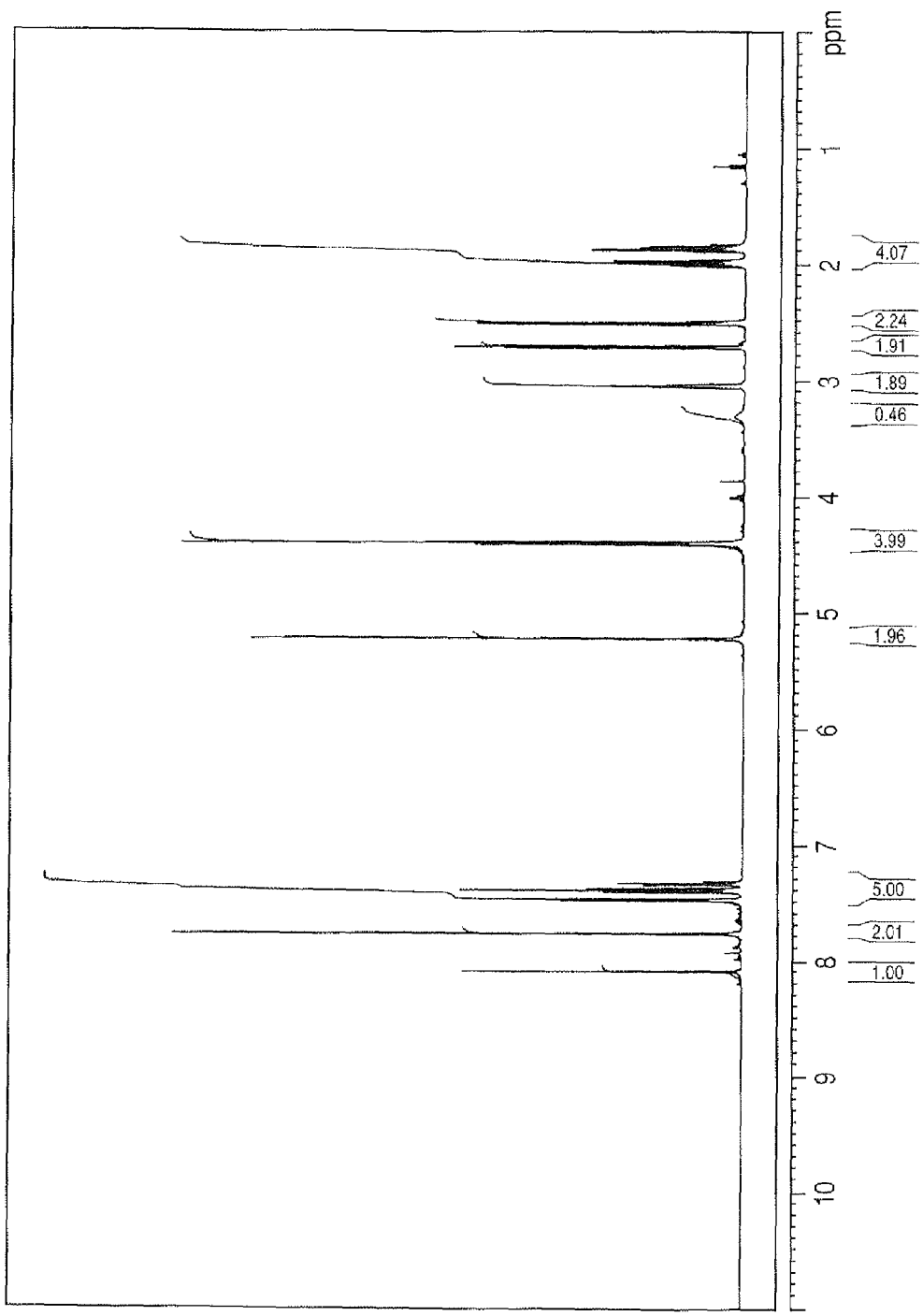
FIG. 5 is a chart illustrating a result of H-NMR measurement on a compound obtained in the course of a synthesis example of the present invention.
Figure 6:
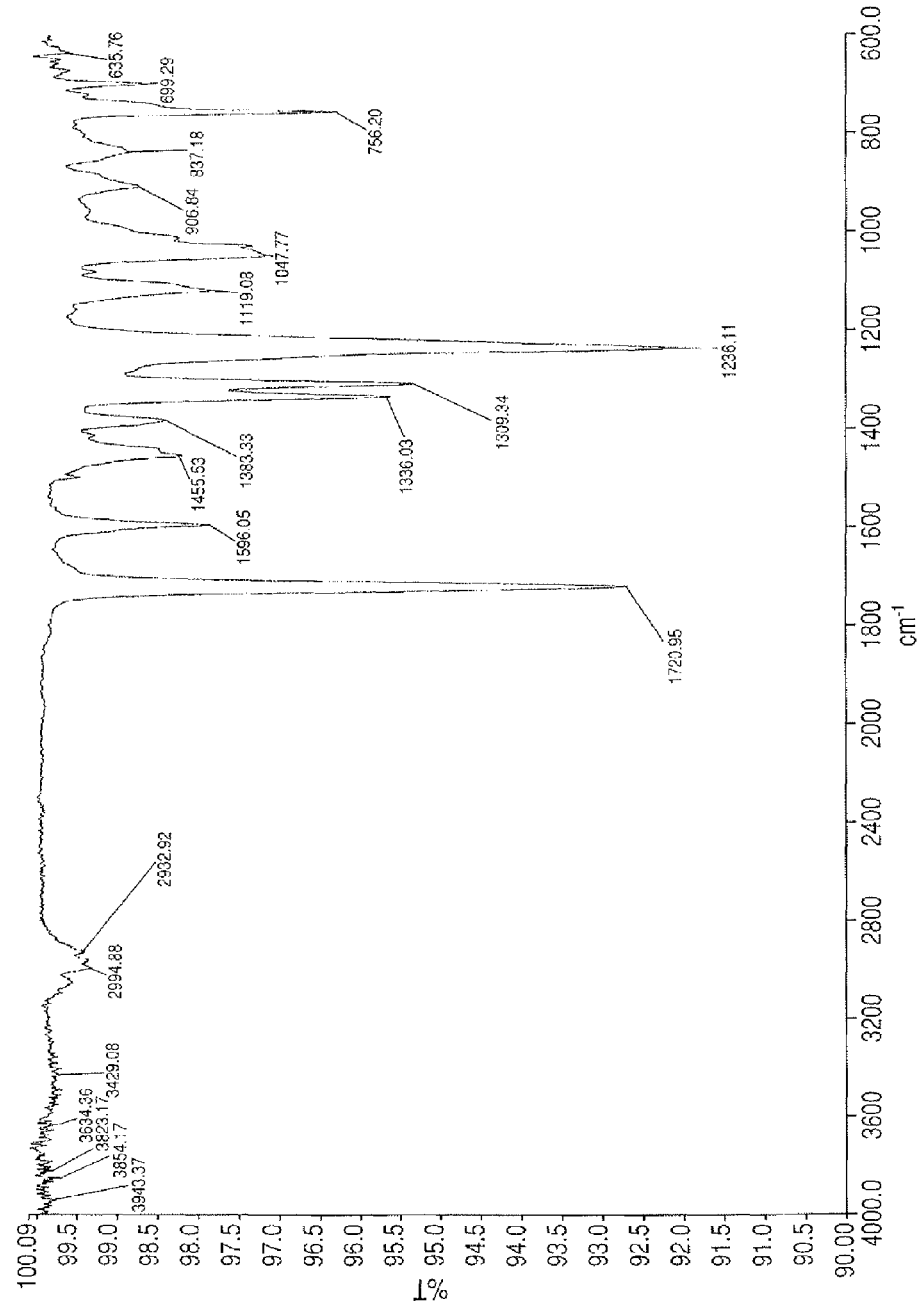
FIG. 6 is a chart illustrating a result of IR absorption measurement on a compound obtained in the course of a synthesis example of the present invention.

After the reaction solution was cooled to 0° C., it was agitated for 2 hours at 0° C., and the deposited white solid was separated by filtration and a 20% aqueous solution of potassium carbonate was added at 0° C. The resulting product was extracted with ethyl acetate, and the extract liquid was rinsed with a 20% potassium carbonate solution and a saturated aqueous solution of sodium chloride, and then dried with anhydrous sodium sulfate. The solvent was distilled off under a reduced pressure, and a resulting residue was purified by a silica gel column chromatography (silica gel: Silica Gel 60 (spherical, neutral) manufactured by Nakalai Tesque Inc., developing solvent: ethyl acetate/cyclohexane=1/1) to obtain 5-benzyloxyisophthalic acid dibutylenoxide (35) as a colorless oily substance (3.4 g, 88%):

The following are the measurement results regarding products. FIG. 5 is a chart illustrating 1H-NMR of the products (relative strength (given unit) in vertical line and chemical shift (ppm) in horizontal line.) FIG. 6 is a chart illustrating IR of the products (optical transmittance in vertical line and numbers of waves in horizontal line.)

1H-NMR (500 MHz, d6-DMSO, δ ppm): 1.83 (m, 2H), 1.99 (m, 2H), 2.51 (dd, $J_1$=3.0 Hz, $J_2$=5.0 Hz, 2H), 2.71 (dd, $J_1$=4.0 Hz, $J_2$=5.0 Hz, 2H), 3.05 (m, 2H), 4.41 (t, J=6.0 Hz, 4H), 5.24 (s, 2H), 7.33 (t, J=7.5, 1H), (7.39 (t, J=7.5, 2H), 7.47 (d, J=7.5 Hz, 2H), 7.77 (d, J=1.5 Hz, 2H), 8.09 (t, J=1.5 Hz, 1H) (cf. FIG. 5);

13C-NMR (500 MHz, d6-DMSO, δ ppm): 31.49 (2C), 45.97 (2C), 49.27 (2C), 62.62 (2C), 70.00, 119.86 (2C), 122.17, 127.81 (2C), 128.15, 128.61 (2C), 131.77, (2C), 136.45, 158.70, 164.75 (2C);

IR (neat): 2994, 2932, 1720, 1596, 1455, 1383, 1336, 1309, 1236, 1119, 1047, 906, 837, 756, 699 (cf. FIG. 6).

The 5-benzyloxyisophthalic acid dibutylenoxide of the formula (35) is an important intermediate in generating a precursor for obtaining a hyper-branched type epoxy resin to be described later.

SYNTHESIS EXAMPLE 1-4

Synthesis of 5-hydroxyisophthalic acid dibutylenoxide

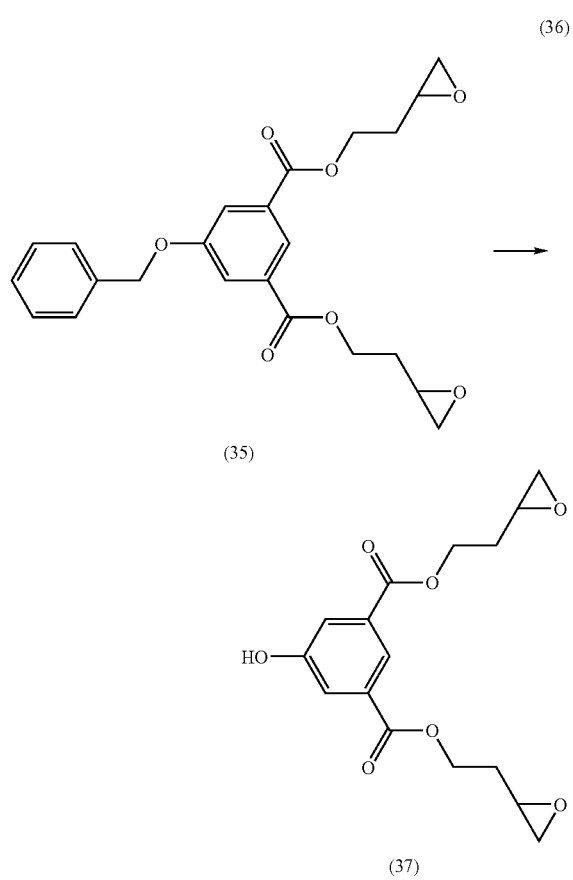

The reaction described in the formula (36) was executed in the following manner.

In a flask equipped with an agitator and a thermometer, 3.3 g (8.0 mmol) of 5-benzyloxyisophthalic acid dibutylenoxide (35) obtained in the aforementioned reaction, and 100 ml of dehydrated ethyl acetate (manufactured by Wako Pure Chemical Industries Ltd.) were charged. The solution was added with 0.8 g of a 20% palladium-carbon (containing 43% of water, manufactured by N.E. Chemcat Inc.) and was agitated for 40 minutes under a hydrogen atmosphere.

Figure 7:
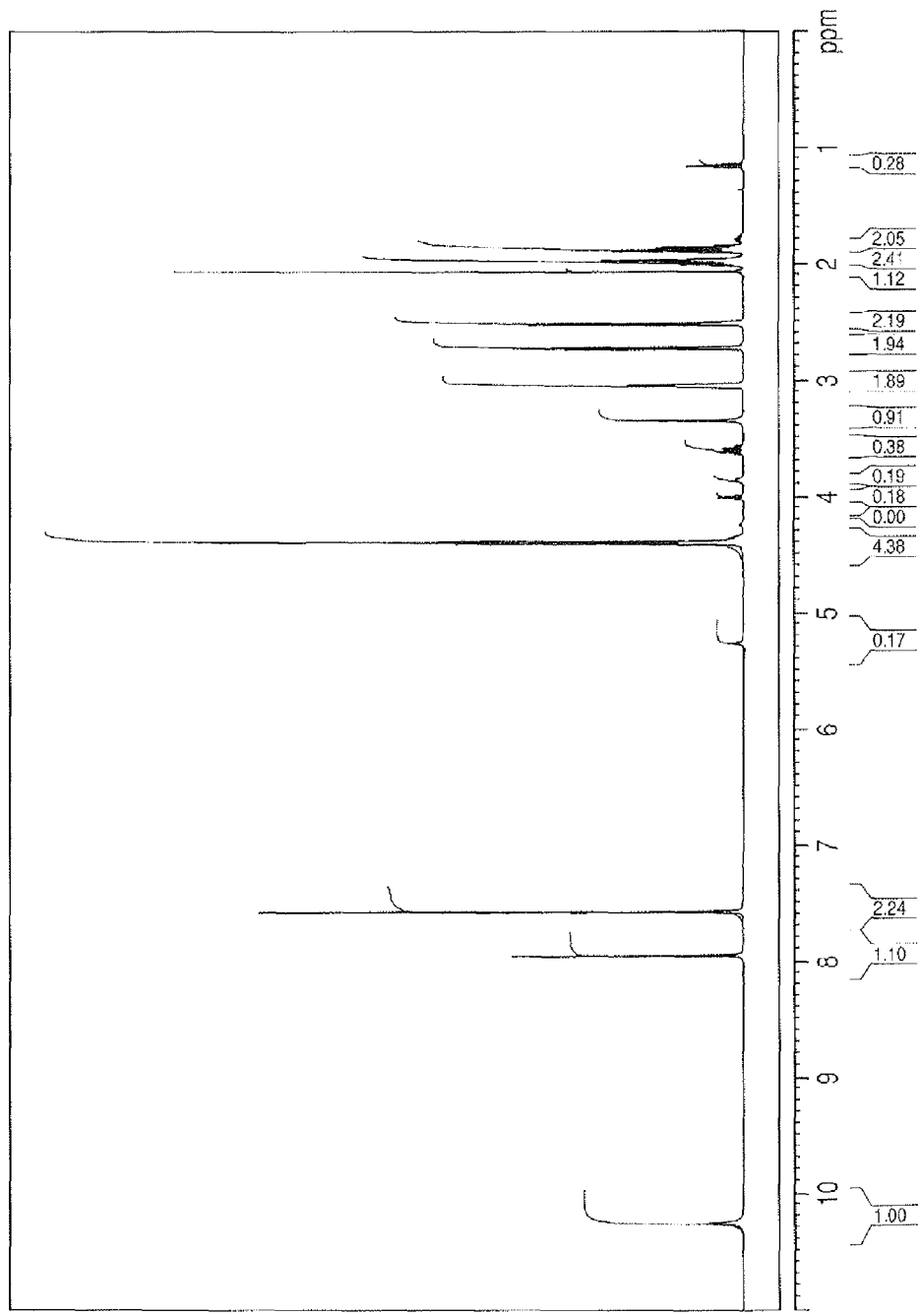
FIG. 7 is a chart illustrating a result of H-NMR measurement on a compound obtained by a synthesis example of the present invention.
Figure 8:
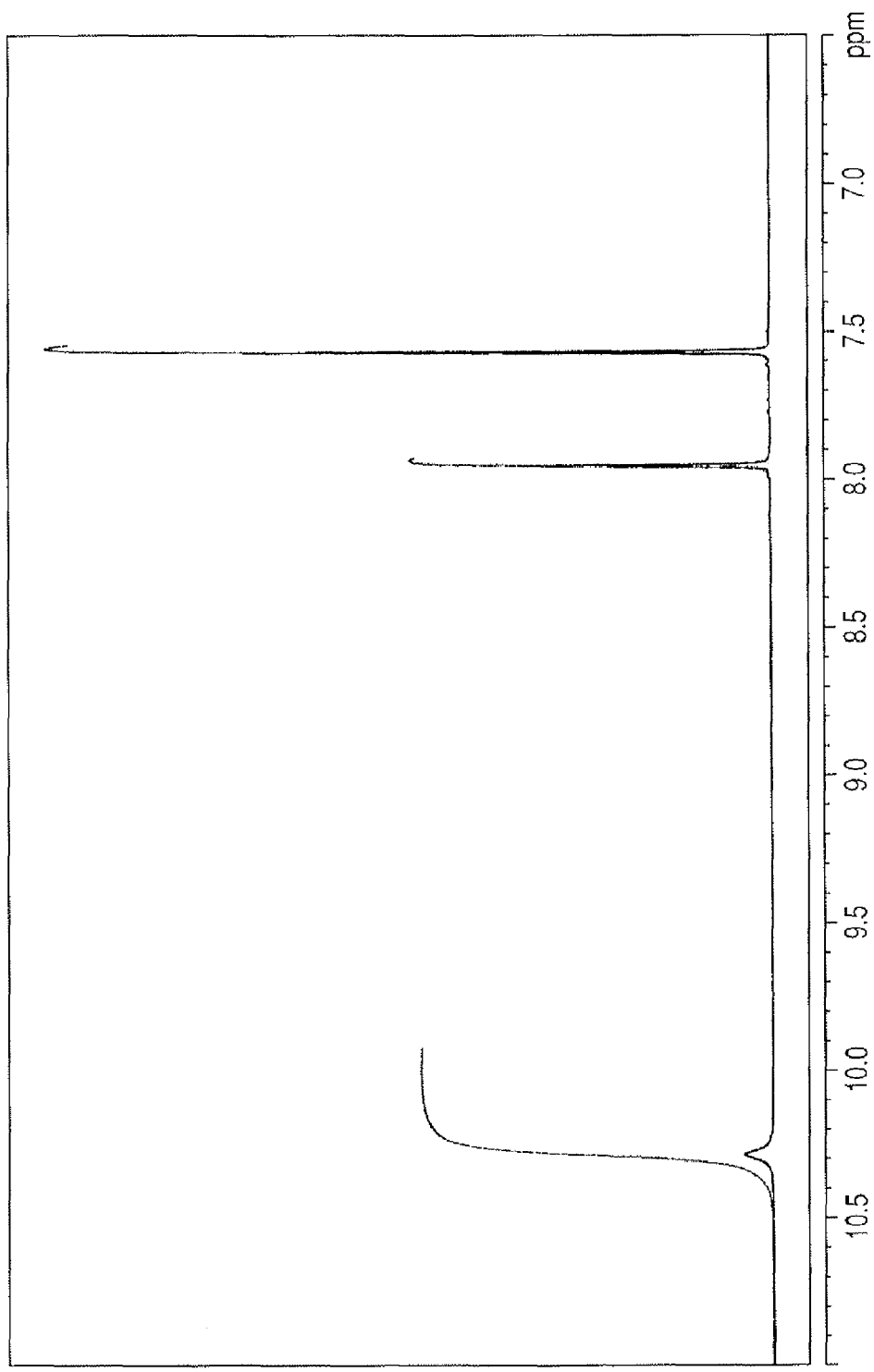
FIG. 8 is a partially enlarged view of FIG. 7.
Figure 9:
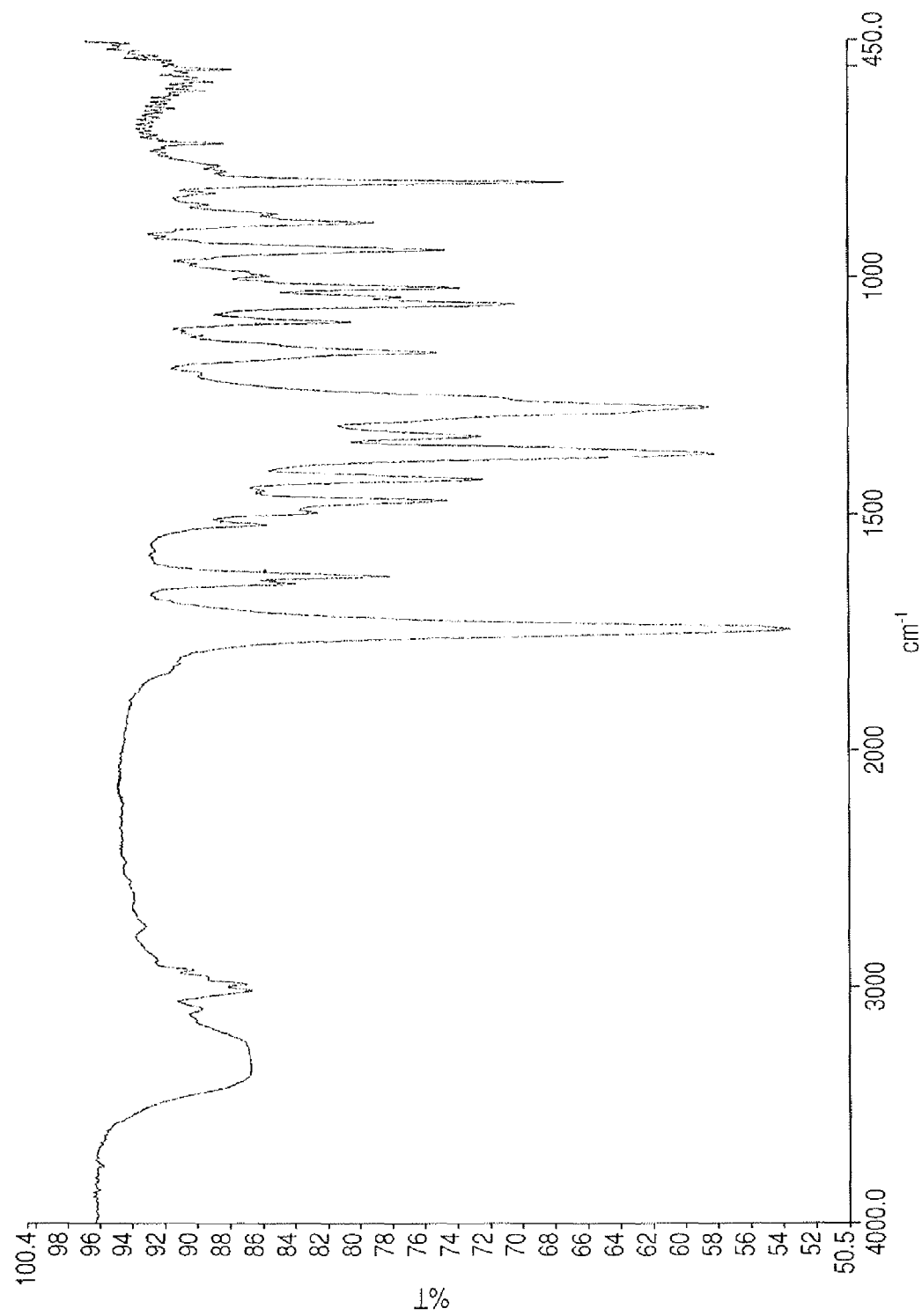
FIG. 9 is a chart illustrating a result of IR measurement on a compound obtained by a synthesis example of the present invention.

Palladium-carbon was filtered off by a cerite filtration from the reaction solution, and then the solvent was distilled off under a reduced pressure. A resulting residue was purified by a silica gel column chromatography (silica gel: Silica Gel 60 (spherical, neutral) manufactured by Nakalai Tesque Inc., developing solvent: ethyl acetate/cyclohexane=1/1) to obtain 5-hydroxyisophthalic acid dibutylenoxide (37) as a white solid (2.3 g, 89%):

The following are the measurement results regarding products. FIG. 7 is a chart illustrating 1H-NMR of the products and FIG. 8 is a partially enlarged view of FIG. 7 (vertical line and horizontal line showing the same units as in FIG. 5.) FIG. 9 is a chart illustrating IR of the products (vertical line and horizontal line showing the same units as in FIG. 6.)

1H-NMR (500 MHz, d6-DMSO, δ ppm): 1.86 (m, 2H), 1.97 (m, 2H), 2.51 (dd, $J_1$=3.0 Hz, $J_2$=5.0 Hz, 2H), 2.72 (dd, $J_1$=4.0 Hz, $J_2$=5.0 Hz, 2H), 3.04 (m, 2H), 4.39 (t, J=6.0 Hz, 4H), 7.57 (d, J=1.5 Hz, 2H), 7.95 (t, J=1.5 Hz, 1H), 10.23 (s, 1H) (cf. FIGS. 7 and 8);

13C-NMR (500 MHz, d6-DMSO, 67 ppm): 31.50 (2C), 45.97 (2C), 49.27 (2C), 62.40 (2C), 120.35 (2C), 120.52, 131.60 (2C), 157.97, 164.99 (2C);

IR (KBr): 3380, 3069, 2988, 2962, 1716, 1617, 1602, 1491, 1464, 1439, 1392, 1336, 1300, 1237, 1119, 1053, 1014, 980, 898, 841, 753, 670 (cf. FIG. 9).

The polyfunctional epoxy compound (37) was obtained as described above.

Synthesis of Hyper-Branched Type Epoxy Resin

POLYMERIZATION EXAMPLE 1

A polymerized substance 1 was obtained by a following method, utilizing the polyfunctional epoxy compound (37) synthesized in Synthesis Example 1.

In a flask equipped with an agitator and a thermometer, 200 mg of the polyfunctional epoxy compound (37), 100 mg of triphenylphosphine (manufactured by Kishida Chemical Co.) and dehydrated N,N-dimethylacetamide were charged, and agitated at 120° C. for 5 hours.

After the reaction, the reaction solution was distilled under a reduced pressure to obtain a hyper-branched type epoxy resin as a polymerized substance 1.

Figure 10:
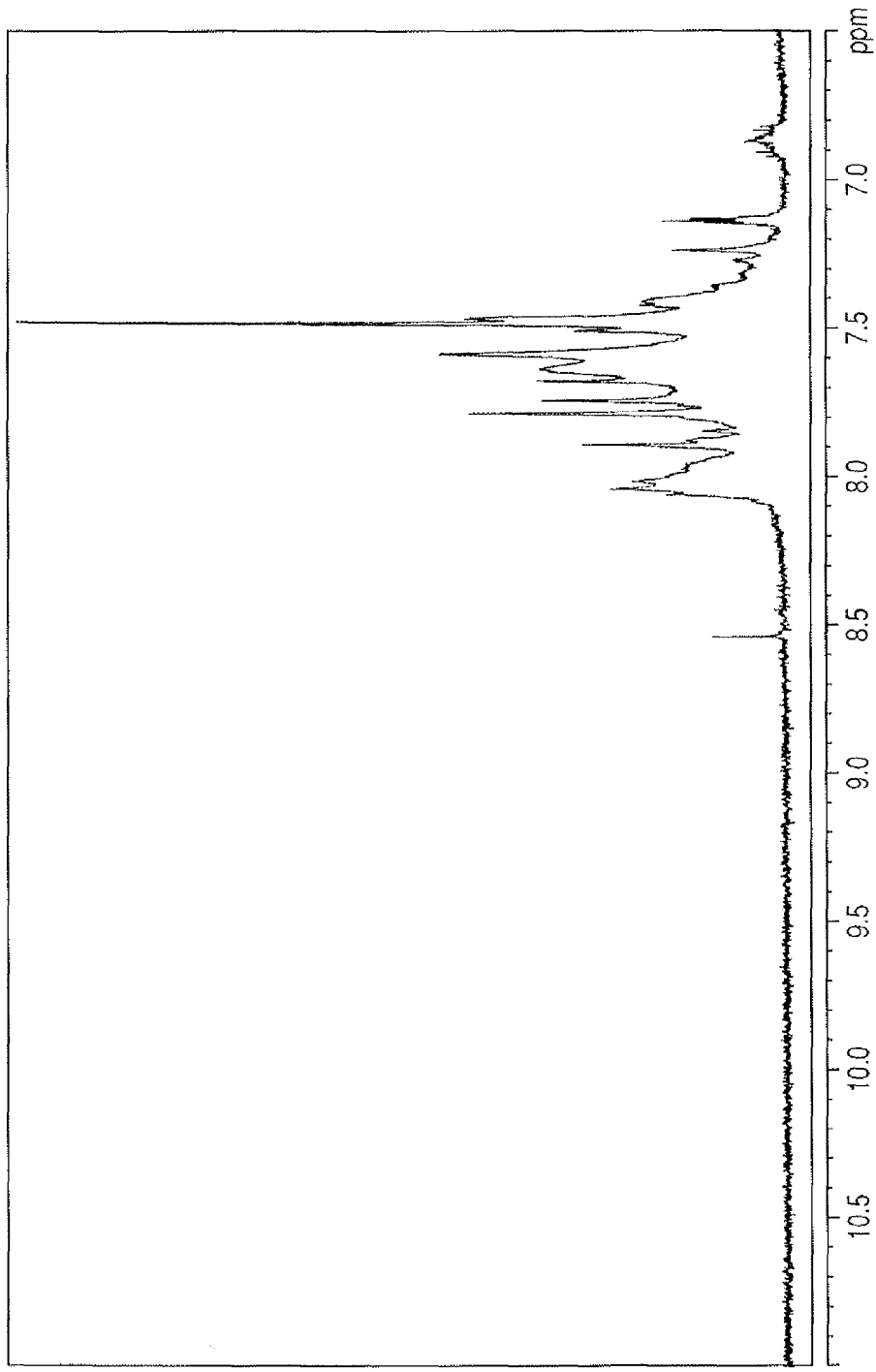
FIG. 10 is a chart illustrating a result of H-NMR measurement on a compound obtained by a polymerization example of the present invention.

FIG. 10 is a chart illustrating H-NMR measurement of the products (vertical line and horizontal line showing the same units as in FIG. 5.) The measurement results of IR is shown below.

The polymerized substance was identified, by a structural analysis, as a hyper-branched type epoxy resin in following points:

(1) While the monomer was easily soluble in ethyl acetate, the polymerized substance was difficultly soluble in the same solvent, so that an increase in the molecular weight was confirmed;

(2) Based on absorption areas and peak intensities in an IR spectrum, generation of hydroxyl group and ether bond, and presence of epoxy group were confirmed; and (3) Based on "an integrated intensity ratio of phenolic hydroxyl group and hydrogen on aromatic ring" in H-NMR, it was confirmed that, in the polymerization, the reaction proceeded not between the epoxy groups but between the phenolic hydroxyl group and the epoxy group:

polyfunctional epoxy compound (I): phenolic hydroxyl group/hydrogen on aromatic ring=1:3, polymerized substance 1:phenolic hydroxyl group/hydrogen on aromatic ring=1:∞ (phenolic hydroxyl group substantially undetectable).

The aforementioned assumption is derived from followings. In a polymerized substance obtained by a reaction of the epoxy groups with each other, the aforementioned integrated intensity ratio of the polymerized substance remains as 1:3 since the phenolic hydroxyl group is not involved in the reaction, but, in a case where the phenolic hydroxyl group and the epoxy group were reacted, the intensity ratio of phenolic hydroxyl group becomes lower since the phenylic hydroxyl groups are consumed in the reaction.

IR (KBr): 3419, 2966, 1725, 1596, 1438, 1337, 1241, 1101, 1047, 998, 891, 845, 756, 721, 692

Cationic Photopolymerizable Epoxy Resin Composition

EXAMPLE 1

100 parts of the hyper-branched type epoxy resin of Polymerization Example 1, and 5.0 parts of a cationic photopolymerization initiator (SP 170, manufactured by Adeka Corp.) were dissolved in 60 parts of a solvent (cyclohexanone) and agitated for 12 hours at the room temperature. Thereafter, the mixture was filtered with a 0.2 μm capsule filter to obtain a cationic photopolymerizable epoxy resin composition 1.

Evaluation of Characteristics

The cationic photopolymerizable epoxy resin composition of Example 1 was subjected to evaluation of photosensitive characteristics such as a coating property, a sensitivity and a resolution, and film characteristics such as a solvent resistance, an adhesion and mechanical characteristics, and, as a result, satisfactory characteristics were obtained.

Micro Structured Member

An exemplary embodiment of the micro structured member of the present invention and the producing method therefor will be described. The present exemplary embodiment will be described by a liquid discharge head as the micro structured member.

EXAMPLE 2

A liquid discharge head was produced by the method illustrated in FIGS. 4A to 4F, utilizing the cationic photopolymerizable epoxy resin composition of Example 1.

The liquid discharge head of Example 2 was subjected to a printing test and a durability test, utilizing an ink as the discharged liquid. As a result, a satisfactory printing was obtained, and the durability was also sufficient, capable of withstanding the use over a prolonged period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-174137, filed Jun. 23, 2006, which is hereby incorporated by reference herein in its entirety.

The invention claimed is:

1. A hyper-branched type epoxy resin comprising a polymerized substance generated from a polyfunctional epoxy compound represented by a formula (I) as a monomer via a self-polymerization reaction thereof and including plural epoxy groups at a terminal site of the polymerized substance, wherein the polyfunctional epoxy compound represented by the formula (I) comprises group A having an aromatic hydroxyl group, a carboxyl group, or an aromatic ring having an amino group, and an epoxy-containing group B having an epoxy group:

$$A\text{-}R\text{-}(B)_n \quad (I),$$

wherein R represents an organic group of (n+1) valence, and n represents 2 or 3.

2. The epoxy resin according to claim 1, wherein the epoxy-containing group B has a structure represented by a formula (II):

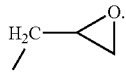
(II)

3. The epoxy resin according to claim 1, wherein the epoxy-containing group B has a structure represented by a formula (III):

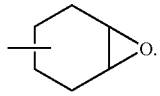
(III)

4. A cationic photopolymerizable epoxy resin composition comprising the hyper-branched type epoxy resin according to claim 1 and a cationic photopolymerization initiator.

5. A micro structured member formed on a substrate comprising a cured substance of the cationic photopolymerizable epoxy resin composition according to claim 4.

6. A producing method for the micro structured member formed on a substrate, the method comprising:
   forming a layer with the cationic photopolymerizable epoxy resin composition according to claim 4; and
   patterning the layer by an exposure and a development.

7. A liquid discharge head comprising an energy generating element for generating an energy to be utilized for discharging a liquid; a discharge port for discharging the liquid; and a flow path for supplying the discharge port with the liquid,
   wherein a discharging port forming member for forming the discharge port comprises a cured substance of the cationic photopolymerizable epoxy resin composition according to claim 4.

8. The epoxy resin according to claim 1, wherein in the formula (I), the group R has a molecular weight of 500 or less and the group B has a molecular weight of 300 or less.

* * * * *